Nov. 30, 1954   O. BERNHARD   2,695,528
TRACTOR

Filed Aug. 10, 1951   4 Sheets-Sheet 1

INVENTOR:
Otto Bernhard,
BY
Freeman & Marmorek,
His Agents.

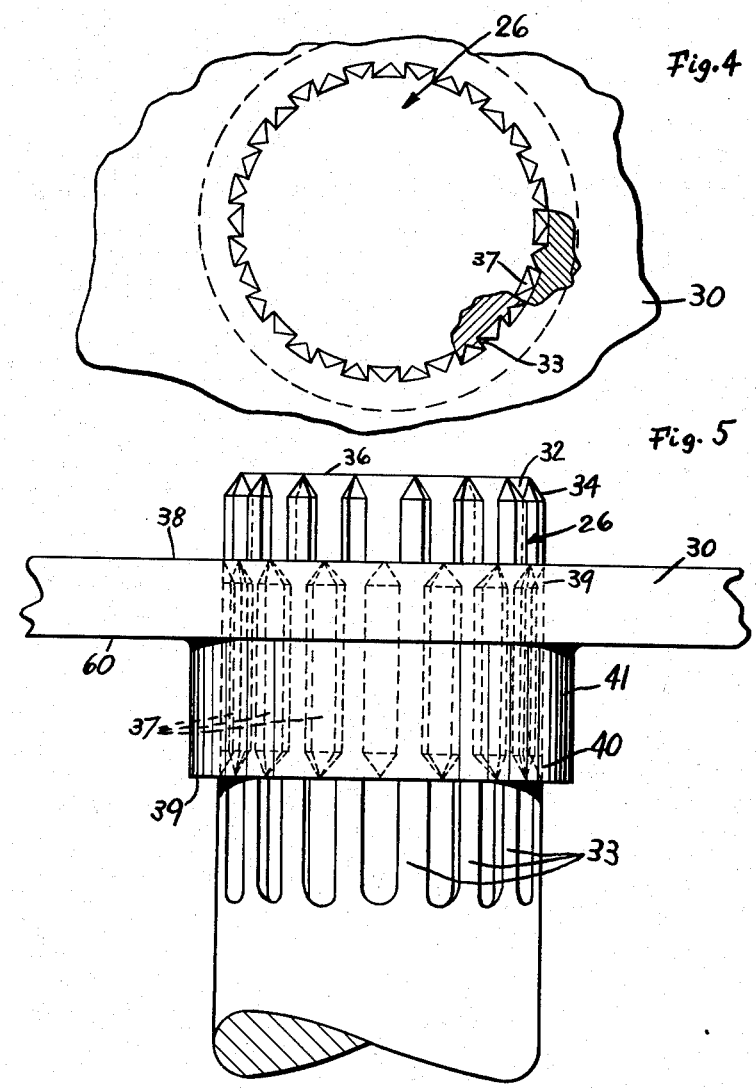

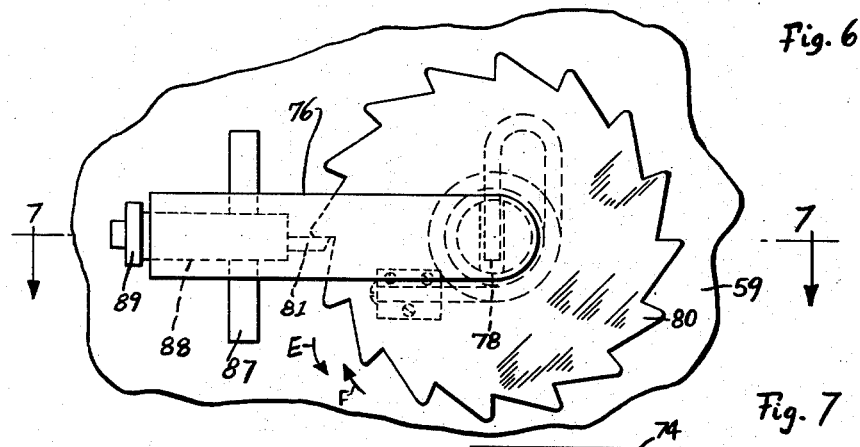
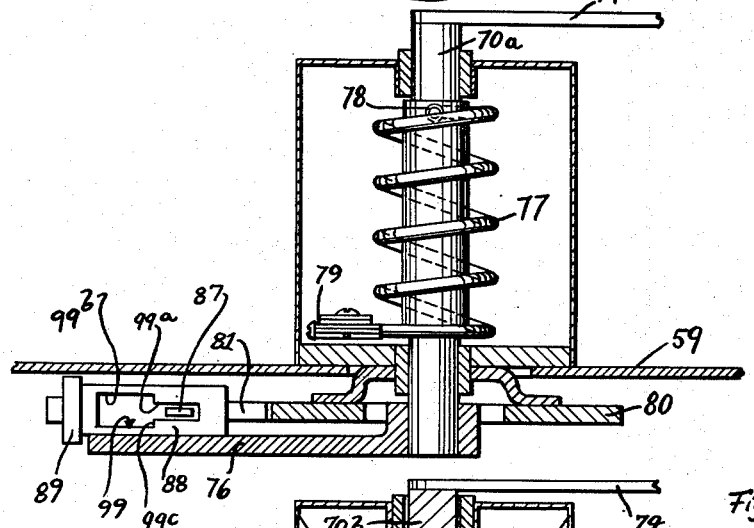
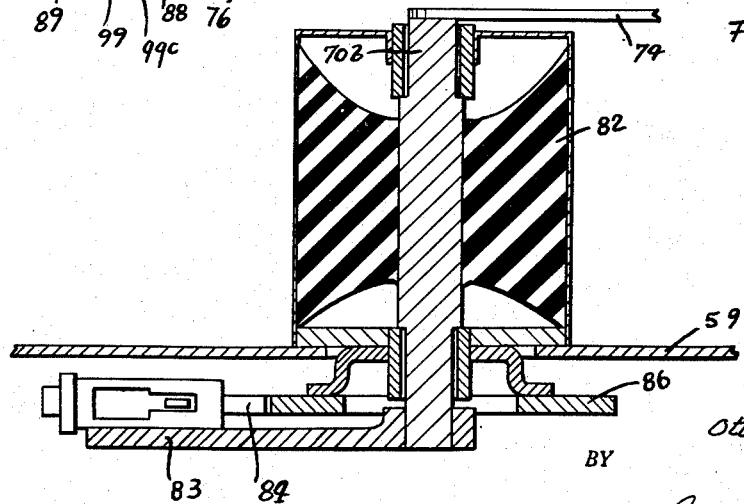

Nov. 30, 1954  O. BERNHARD  2,695,528
TRACTOR
Filed Aug. 10, 1951  4 Sheets-Sheet 4

INVENTOR:
Otto Bernhard,
BY Freeman & Marmorek,
His Agents.

United States Patent Office 2,695,528
Patented Nov. 30, 1954

2,695,528

TRACTOR

Otto Bernhard, New York, N. Y.

Application August 10, 1951, Serial No. 241,308

15 Claims. (Cl. 74—217)

The invention relates to transmissions, and relates more particularly to variable speed transmissions. The invention is peculiarly applicable for tractors, and will in the following be explained in connection therewith, it being understood that the invention is not limited to such application and is equally well suited for use in connection with other devices, the particular explanation being given for the sake of illustration and clarity.

It is among the objects of the invention to provide a variable speed transmission that is easy to manufacture and maintain and that in use may be operated effortless by the operator stationed at a point remote from the transmission.

Reference is being had to my Patent No. 2,375,184, dated May 8, 1945, for tractor. In that patent there was described and shown a tractor including a variable transmission; however, in order to shift between the two positions of the transmission mechanism, it was necessary for the operator to leave his seat and to dismantle the cover of the transmission casing for subsequent manual shifting of the transmission between the speeds for farm work and respectively for travel on the road, by the tractor. The instant invention provides for automatization of such a variable speed transmission, and operation by remote control, for instance from the driver's seat.

As a rule, farm tractors are employed for heavy work, such as plowing or harrowing, during which the tractor moves over the ground at slow speed, for instance at about 3.36 miles per hour. In going to and from the farm land, the tractor travels over roads, and it is desirable that this be done at a speed of about 40 miles per hour. A further desiratum is that the tractor moves with equal facility, for long periods of time of trouble free operation, at either speed. In accordance with the instant invention, this is accomplished by a single shifting operation that is easily and effortlessly carried out by the operator without leaving his seat.

Broadly speaking, this is accomplished by providing a transmission mechanism between a driving shaft and a driven shaft of the machine, such as the tractor, and the mechanism in one shifting position provides for a predetermined transmission ratio between the shafts. By a simple means the transmission may be reversed, so that the ratio is inversed in a second shifting position, thereby changing the speed of the driven shaft before and after the shifting in accordance with the square of the ratio. Thus, if the ratio is 1:3.5, the differences in speed before and after will be 12.25; if one of the shifting positions corresponds to a speed of 3.3 miles per hour, the other position will correspond to a speed of 40 miles per hour.

The foregoing and other objects of the invention will be best understood from the following description of exemplifications thereof, reference being had to the accompanying drawings, wherein:

Fig. 4 is a fragamentary large scale elevational view, partly in section, of an end portion of one of the main shafts shown in Fig. 2, carrying a sprocket wheel;

Fig. 5 is a fragmentary large scale side elevational view of the parts shown in Fig. 4;

Fig. 6 is a fragmentary large scale elevational underside view of a ratchet mechanism for the tensioning means shown in Figs. 1 and 2;

Fig. 7 is a large scale fragmentary sectional view, taken on line 7—7 of Fig. 6;

Fig. 8 is a large scale fragmentary sectional view, similar to Fig. 7, but embodying a modification.

Figure 1:
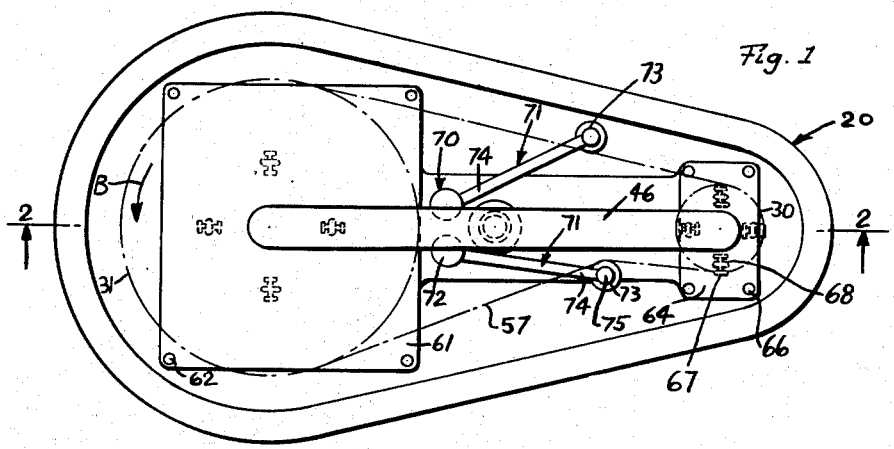
Fig. 1 is an elevational view of a variable speed drive in accordance with the invention, the cover having been removed.
Figure 2:
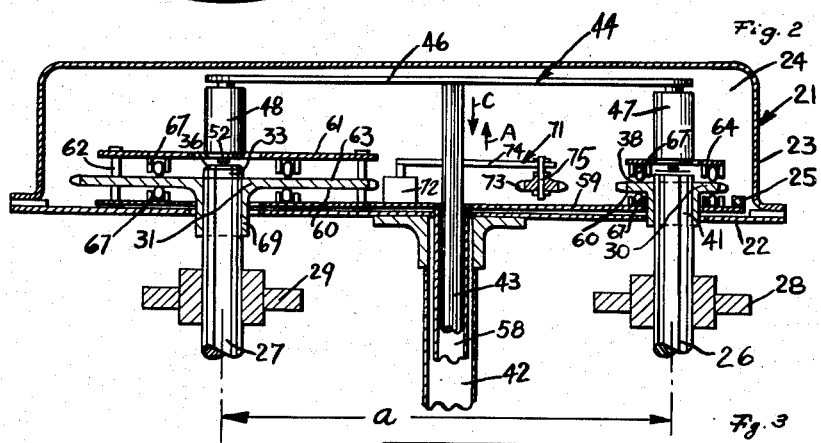
Fig. 2 is a fragmentary sectional view, taken on line 2—2 of Fig. 1.

In carrying the invention into effect in the embodiments which have been selected for illustration in the accompanying drawings and for description in this specification, and referring now particularly to Figs. 1 and 2, there is provided a variable transmission mechanism generally indicated at 20. The mechanism 20 comprises a housing 21 that includes a base 22 and a cover 23.

Two main shafts extend with their ends into the chamber 24 defined by the housing 21, namely a main driven shaft 26, and a main driving shaft 27. These shafts 26 and 27 form parts of the machine, for instance the tractor, to which the mechanism 20 is applied. Driving means for the driven shaft 26 are schematically indicated at 28, and driven means for the driving shaft 27 are schematically shown at 29.

There is a predetermined distance $a$ between the axes of the shafts 26 and 27, and this distance is predetermined and fixed by the machine, such as the tractor.

Each of said main shafts carries a gear, such as a sprocket wheel, for instance in the position shown in Figs. 1 and 2. The shaft 26 carrying a small sprocket wheel 30, and the shaft 27 carrying a large sprocket wheel 31. This is just the right position of the sprocket wheels 30 and 31 for high speed movement on roads.

As best shown in Figs. 4 and 5, where there are illustrated parts of the shaft 26 and of the sprocket wheel 30, the shaft 26 has an end portion 32 that is provided for a portion of its length on the exterior with splines 33 defining grooves therebetween. The very end of the shaft is chamfered at 34 and so pointed. Each of the splines 33 is tapered towards the end surface 36 of the shaft 26. The shaft 27 is likewise splined with splines 33 defining therebetween grooves and chamfered and pointed at 34, identical in point of dimensioning including the number of splines 33 and grooves with that of the shaft 26.

The sprocket wheel 30 has internal splines 37 matching the grooves between the splines 33 of the shafts. Near the end surfaces 38 and 39, the sprocket wheel 30 is internally chamfered at 39 and 40, and pointed for tapering at the opposite ends of each of the splines 37. The sprocket wheel 31 is similarly internally splined and chamfered and pointed.

This splining and chamfering and pointing of the shafts as well as the wheels, the dimensioning of diameter and splining being the same for both shafts 26 and 27, and the diameter and dimensioning of splining, chamfering and pointing being the same for both wheels 30 and 31, except the length of the hub 41 into which the splines 37 extend. The arrangement on the interior of the wheels matches that of the exterior of the end portions 32 of the shafts 26 and 27. By this spline construction, each of the wheels 30 and 31 can be slid onto and off a shaft, the chamfering and pointing on the shafts and wheels facilitating the movement of a wheel onto a shaft.

Figure 3:
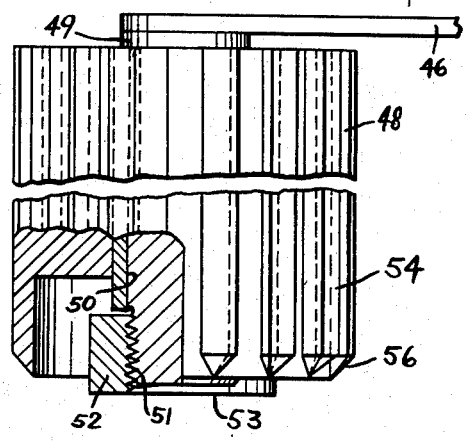
Fig. 3 is a fragmentary large scale elevational view, partly in section, of one of the auxiliary shafts shown in Fig. 2.
Figure 9:
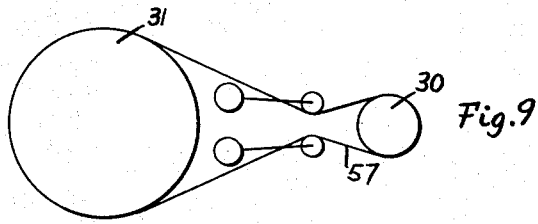
Figs. 9–13 are schematic views showing various arrangements for tensioning the chain of the transmission, wherein Fig. 9 corresponds to the arrangement shown in Fig. 1, and Figs. 10–13 show modifications.
Figure 10:
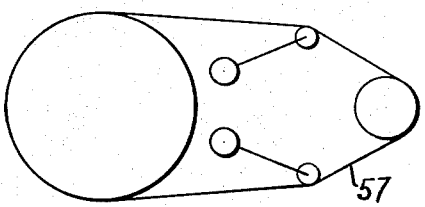
Figure 11:
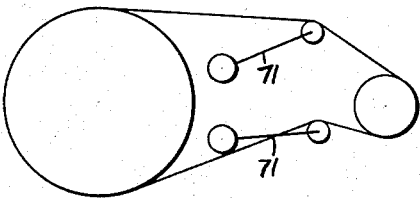
Figure 12:
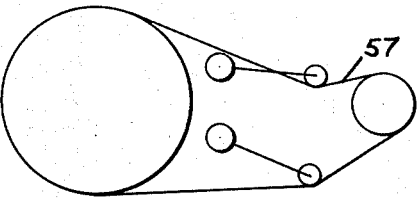

The base 22 of the housing 21 is supported midway between the shafts 26 and 27 by means of a hollow tubular support 42. Centrally of, and coaxial with, said tube 42 there is disposed a rod 43 that forms part of a support generally designated 44. The rod 43 is connected to a bracket 46 on which there are mounted two auxiliary shafts, namely the auxiliary shaft 47 and the auxiliary shaft 48. The auxiliary shafts are so mounted on the bracket 46 that their axes are spaced from each other also for the distance $a$. As shown in Fig. 2, each of the auxiliary shafts 47 and 48 may be juxtaposed with one of the main shafts 26 and 27. The auxiliary shafts 47 and 48 are mounted rotatably on the bracket 46. As best shown in Fig. 3, means such as a pin 49 may be secured to the bracket 46 and has a cylindrical bearing surface 50 to journal the auxiliary shaft, for instance the auxiliary shaft 48 shown in Fig. 3. The pin 49 may carry at its free end a thread 51 on which there is engaged a nut 52 that serves as a spacer and has a frontal surface 53 with which it may abut against the surface 36 of the main shaft with which it is momentarily juxtaposed, limiting the movement of the auxiliary shaft and thus of the support 44 in direction towards the main shafts.

As best shown in Fig. 3, the auxiliary shaft 48 is provided with splines 54 and is chamfered and pointed at 56, in exactly the same manner and to the exact dimensions of diameter and splining of the main shafts 26 and 27. The other auxiliary shaft 47 is splined in exactly the same manner to exactly the same dimensions.

Thus, each of the wheels 30 and 31 may slide onto and from, not only the main shafts 26 and 27, but also the auxiliary shafts 48 and 47, and the splines provide for torque engagement between either sprocket wheel and any of the main and auxiliary shafts.

A chain 57 may be suspended between the sprocket wheels 30 and 31 (Fig. 1 and Figs. 9–13). Thus, in the position shown in Fig. 2, driving momentum will be transmitted from the shaft 27 to the wheel 31 to the chain 57, to the wheel 30 and to the driven shaft 26.

Between the tube 42 and the rod 43, there is telescoped a tubular member 58 that is connected to a plate 59 which is disposed in the chamber 24 adjacent the base 22. The plate 59 is disposed opposite the outside or hub side surfaces 60 of the wheels 30 and 31. An auxiliary plate 61 is positioned opposite the other surface 63 of the wheel 31, and is secured in spaced relation to the plate 59 by means of bolts 62.

A second auxiliary plate 64 is positioned opposite the other surface 38 of the sprocket wheel 30, and is also secured in said spaced relation to said plate 59 by means of bolts 66 (Fig. 1). Pusher members 67 are connected to the plate 59 adjacent the wheels 30 and 31, and also to the auxiliary plates 61 and 64 adjacent said wheels. Each pusher member 67 carries on its free end a roller 68 journalled in the pusher member 67 in such a manner that its axis is radial of the main shaft adjacent to it.

The operation is as follows.

In the embodiment illustrated in Figs. 1 and 2, the outline and configuration of the housing 21 is such that during the shifting from one transmission position to the other the housing partakes in the movement axially of the shafts 26 and 27 as well as in the turning or swinging movement of the support 44.

Normally, the auxiliary shafts 47 and 48 are aligned with the main shafts 26 and 27, though spaced therefrom for a short distance, as shown in Fig. 2. When it is desired to shift to the other transmission position, for instance from the position shown in Figs. 1 and 2, it will first be necessary to move the support 44, by means of the rod 43 in direction C until the spacers 53 abut against the main shafts; thereafter, it is necessary to slide the sprocket wheels 30 and 31 off the shafts 26 and 27, respectively, and onto the auxiliary shafts. In the embodiment shown in Fig. 2 this is done by moving first in direction C the rod 43, and then in the direction A simultaneously the tubes 42 and 58 while the rod 43 remains at rest. Finally, the rod 43 is also moved in direction A to space the auxiliary from the main shafts. For this purpose, these tubes 42 and 58 may be releasably interconnectable by any suitable means (not shown), and the movement may be made by hand from the driver's seat, or by power of a motor or other means, for instance hydraulic or pneumatic means (not shown) controllable from the driver's seat. By the movement in direction A of the tube 58, there is moved in the same direction the plate 59 and with it the auxiliary plates 61 and 64. The rollers 68 of the pushers 67 of the plate 59 will abut against the surface 60 of the wheels 30 and 31, and will move the wheels off the main shafts 26 and 27 pushing them onto the auxiliary shafts 47 and 48.

The auxiliary shafts 47 and 48 are journalled rotatably on the pins 49 in order to make possible this movement in the direction A, while the shafts 26 and 27 are at rest without requiring initial registry of the splines of the opposing shafts. The chamfering and pointing of the splines 54 of the auxiliary shafts and of the splines 37 of the wheels renders possible that transfer. If now the sprocket wheels 30 and 31 are sliding from the main shafts 26 and 27 to the auxiliary shafts 47 and 48, these auxiliary shafts can rotate about their axes if the pointed and chamfered splined sections of the sprocket wheels come in contact with the pointed and chamfered splined sections of the auxiliary shafts, so that there will be easy meshing between the splines of one and the grooves of the other. The same applies when the sprocket wheels are shifted from the auxiliary shafts to the main shafts, as explained further below. The movement in direction A is continued until the wheels 30 and 31 have been taken off entirely the shafts 26 and 27 and engage entirely the auxiliary shafts 47 and 48, and the cover 22 has been moved beyond the end surfaces 36 of the main shafts 26 and 27.

Thereafter, the tubes 42 and 58 and the rod 43 simultaneously are turned for one half of a full turn, for instance in direction B (Fig. 1). At the end of this turning movement, the auxiliary shaft 47 which carries the small wheel 30 will be opposite the driving shaft 27, and the auxiliary shaft 48 which carries the large wheel 31 will be opposite the driven shaft 26. Means (not shown) may be provided for arresting the turning movement when either of the auxiliary shafts 47 or 48 is in exact axial alignment with one of the main shafts.

Subsequently, in this second shifting position, the tubes 42 and 58 and the rod 43 are moved in the direction C (Fig. 2) axially of the shafts 26 and 27. This will cause the rollers 68 of the pushers 67 of the auxiliary plates 61 and 64 to engage the surfaces 38 and 63 of the wheels 30 and 31, respectively, pushing the wheels off the auxiliary shafts and onto the main shafts. It will be noted that the hub 41 of the small wheel 30 is shorter than the hub 69 of the large wheel 31. This difference in hub length brings about that the large wheel 31 will engage the main shafts ahead of such engagement by the small wheel 30, so that in this stepped engagement a full engagement in the end by both wheels is facilitated.

This movement in the direction C ends when the cover 22 has reached again the position shown in Fig. 2. Finally, the tube 58 and the rod 43 are again moved in direction A, to space the auxiliary from the main shafts and to space the rollers 68 off the wheels 30 and 31. Means (not shown) may be provided to limit the movement in directions A and C axially of the main shafts 26 and 27. As explained previously, the faces 53 of the nuts 52 provide for such abutment in the direction C; however, other limiting means may be provided, relegating the function of the spacers 52 merely as safeguards. The main shafts do not partake in either the shifting in directions A and C nor in swing turning, for instance in the direction B.

During this shifting and swinging, the chain 57 remains engaged throughout by both sprocket wheels 30 and 31.

In order to balance the weight of the cover 21 with respect of the axis of rotation of the tube 42, there are provided one or more counterbalancing masses 25 (Fig. 2).

In accordance with a modification, the base 22 and cover 23 may be arranged stationary and having such dimensions of height and being, for instance, circular, to permit the shifting entirely within the confines of the chamber 24. In that event, the tube 42 would remain at rest throughout and only the tube 48 and the rod 43 be shifted in directions A and C and turned.

The wheels 30 and 31 form a set for a particular transmission ratio. By removing the cover 23, the set in place may be exchanged for a different set of wheels to provide for a desired new ratio. This is possible within wide limits of sprocket ratio using the same chain.

Means are provided, generally designated 70, for tensioning of the chain 57. The means 70 includes two sprung tensioners 71 and each comprises a pin 72 that is connected to the plate 59, an idler sprocket wheel 73 that engages the chain 57, and a lever 74 between the pin 72 and the idler 73 and which is sufficiently long to permit engagement of the idler 73 with the chain 57. The idler 73 is freely turnable on the lever 74 for instance by journalling it by means of a bolt 75.

Resilient means are provided for biasing each tensioner 71 to press either from the inside (Fig. 10) or from the outside (Figs. 1 and 9), or one from the inside and the other from the outside (Figs. 11–13) against the two strands of the chain 57.

One embodiment of resilient means for a tensioner 71 is shown in Figs. 6 and 7. The pin 70a that carries the lever 74 is freely turnably journalled relative to the plate 59 and carries on its free end on the other side of the plate 59 a bracket 76 keyed to the pin 70a. A helical spring 77 surrounds the pin 70a and has one end 78 connected to the pin 70a, and the other end 79 secured with relation to the plate 59. A ratchet wheel 80 is secured to the plate 59, and the bracket 76 carries a retractable resiliently pressed pawl 81 that engages the ratchet wheel 80. Turning of the bracket 76 in the direction E (Fig. 6) will cause pretensioning of the spring 77; the pretension may be released by retracting the pawl 81 and turning the bracket 76 in the opposite direction F.

Another embodiment is shown in Fig. 8. A rubber element 82 may be connected on its exterior with relation to the plate 59, and connected on its interior with the pin 70b that carries the lever 74. The pin 70b has a bracket 83 that carries a pawl 84 which cooperates with a ratchet wheel 86 secured with relation to the plate 59.

Figure 13:
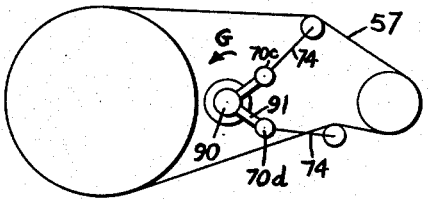

In the embodiment shown in Fig. 13, a spring (not shown) biases a single pin 90 that is connected to the plate 59, in the direction G, journalling a bell crank lever 91 that carries two pins 70c and 70d each of which carry the levers 74.

The pawl 81 is part of a cylinder which is placed within a coaxial cylindrical casing 88 that has a lid 89. The cylindrical part of the pawl 81 (not shown) is wider near the ratchet wheel 80 and smaller at the far part. The wider part is apertured, and a rod 87 is placed inside the aperture. The rod 87 has flat ends, while its middle part is cylindrical. (Fig. 7). The casing 88 has two opposite openings 99 that guide the ends of the rod 87. The openings 99 are smaller at 99a and larger at 99b with a shoulder 99c therebetween. When the rod 87 is disposed near the wider part 99b, it may be turned manually for a quarter of a full turn and then comes to rest against the shoulder 99c under the tension of a spring (not shown) urging the pawl 81 towards the ratchet wheel 80. Thereby the pawl 81 is locked out-of-engagement with the ratchet wheel 80 and thus the pin 70a is able to revolve until the spring momentum of the sprung idler 71 (Fig. 2) becomes zero. This is, for example, expedient when the tractor needs to be shut down temporarily. By reversing this process, the pawl 81 makes again contact with the ratchet wheel 80 and, through rotation of the bracket 76, the sprung idler 71 again obtains the right spring momentum.

Certain of the advantages have already been alluded to. It may be useful, however, to refer again to the simplicity of the operation by reiterating in brief the five simple steps required:

*One.*—The operator will first put the machine to standstill. He will then shift the bracket 46 in direction C until the nuts 52 of the auxiliary shafts 47 and 48 abut against the ends of the main shafts 26 and 27, respectively.

*Two.*—The operator will then shift the plate 59 and the chain drive casing 21 in direction A, so that both sprocket wheels 30 and 31 with their hubs 41 and 69 are removed off the main shafts 26 and 27 and are shifted to the auxiliary shafts 47 and 48. This can be executed easily under the conditions prevailing as follows:

(1) The auxiliary shafts are rotatable about their axes so that they can turn to engage the hubs of the sprocket wheels for meshing both sprocket wheels with the auxiliary shafts.

(2) The chain 57 that is suspended between the sprocket wheels 30 and 31 must have a sag that is sufficient for the required turning movement of the auxiliary shafts during the meshing engagement. The chain 57 will, under the influence of the sprung idlers 73, assume one of the positions shown in Figs. 9 through 13 depending on the specific tensioner arrangement, as soon as the sprocket wheels, including their hubs, are removed off the main shafts 26 and 27.

*Three.*—The operator will thereupon turn the casing 21 with all its contents for one-half of a full turn, for instance in direction B.

*Four.*—The operator will subsequently shift the plate 59 with the auxiliary plates 61 and 64 of the casing 21 in direction C until the sprocket wheels are again engaged in abutment against the main shafts 26 and 27. During this movement, the wheels 67 of the auxiliary plates 61 and 64 transport the sprocket wheels towards their new position, while enabling the sprocket wheels to rotate together with the auxiliary shafts 47 and 48 about the axes of said auxiliary shafts. Such a rotating movement will occur as soon as the splined sections of the hubs begin to mesh with the splined sections of the main shafts 26 and 27.

*Five.*—The operator will thereupon shift the plate 59 again in direction A, together with the auxiliary plates 61 and 64 and with the casing 21, until the chain drive becomes free and is again ready for work.

The advantage of the sprung idlers 73 described herein include that both strands of the chain 57 are tensioned and, therefore, no dangerous vibrations can arise.

It will be apparent to those skilled in the art that the novel principles of the invention disclosed herein in connection with specific exemplifications thereof will suggest various other modifications and applications of the same. It is, accordingly, desired that in construing the breadth of the appended claims they shall not be limited to the specific exemplifications of the invention described herein.

Having thus described the invention, what I claim as new and desire to be secured by Letters Patent, is as follows:

1. A variable speed transmission, having a driving main shaft and a driven main shaft, said main shafts being parallel and spaced apart for a certain distance, and each including an end portion having splines identical for both shafts in dimension and number, and a mechanism operable to transmit power between said shafts, said mechanism comprising, a support journalled midway intermediate the axes of said main shafts for rotatable swinging movement and shiftable axially, two auxiliary shafts mounted on said support and having their axes spaced for said certain distance, whereby said mechanism may be so positioned that each auxiliary shaft is disposed in axial alignment with a selectable main shaft at a selectively variable distance between the auxiliary and main shaft ends, each of said auxiliary shafts having an end portion including splines identical in dimension and number with those of said main shafts, two gear wheels of different diameters each having a hub splined interiorly to fit on said shaft portions for sliding movement axially thereof, and for torque transmission between said wheel and said portion of a main shaft, a transmission element interconnecting said gear wheels to transmit rotational power therebetween, each of said wheels normally engaged on a main shaft and being slidable off the same onto an auxiliary shaft aligned therewith for being subsequently swung thereby into a position opposite the other main shaft for ensuing movement onto said other main shaft for engagement thereon to change the transmission ratio between said main shafts, means operable for simultaneously slide shifting both wheels intermediate said main shafts and said auxiliary shafts, and means actuable from the exterior of said mechanism for turning said support when said wheels are positioned entirely on said auxiliary shafts.

2. In a variable speed transmission, as claimed in claim 1, together with, all of said shaft end portions and hubs being chamfered and pointed to facilitate sliding onto said shafts of said wheels.

3. In a variable speed transmission, as claimed in claim 1, said means for shifting said wheels including a main plate positioned on one side of said wheels and shiftable oppositely axially of said shafts between a first extreme position wherein said wheels are engaged on said main shafts, and an opposite second extreme position wherein said wheels are engaged on said auxiliary shafts, and being turnable about the axis of said support together therewith, two auxiliary plates connected to said main plate and movable therewith and each positioned on the opposite side of a wheel, pusher members connected to each plate and operable to engage a face of said wheels upon movement of said main plate in one direction for pushing said wheels between said main shafts and said auxiliary shafts, and an extension connected to said main plate and extending to the exterior of said mechanism for shifting said main plate.

4. In a variable speed transmission, as claimed in claim 1, each of said auxiliary shafts being rotatably journalled, and a pin for each auxiliary shaft secured to said support and journalling said auxiliary shaft.

5. In a variable speed transmission, as claimed in claim 1, said means for shifting said wheels including pusher members being abuttable with the opposite faces of said wheels and each including a rotational element permitting turning of said wheels during abutment by said members, said auxiliary shafts being rotatable about their axes, whereby during shifting between said main shafts and said turnable auxiliary shafts said wheels will be abutted by said members and may rotate at the same time, for facilitating said shifting.

6. In a variable speed transmission, as claimed in claim 1, together with, a spacer mounted on the front of each auxiliary shaft and having a reduced width compared thereto and being operable to make contact with the face of a main shaft to limit movement of said auxiliary shafts toward said main shaft.

7. In a variable speed transmission, as claimed in claim 1, together with, a casing including a base and a cover defining on the interior a chamber housing said mechanism, and being shiftable with said support beyond the ends of said main shaft for turning clearance and in that shifted position being turnable together with said support about the axis of rotation.

8. In a variable speed transmission, as claimed in claim 1, together with, a casing including a base and a cover defining on the interior a chamber housing said mechanism, and being shiftable with said support beyond the ends of said main shaft for turning clearance and in that shifted position being turnable together with said support about the axis of rotation, said mechanism being asymmetrical, said cover being dimensioned asymmetrically corresponding to said mechanism, and weight means operable to balance the weight thereof in respect of said axis of rotation.

9. In a variable speed transmission, as claimed in claim 1, said wheels having teeth, said transmission element including a sprocket chain suspended between said wheels, said mechanism including resiliently biased means operable for tensioning said chain.

10. In a variable speed transmission, as claimed in claim 1, one of said wheels having a different number of teeth than the other, each set of two selected wheels constituting a ratio of numbers of teeth and thereby of transmission, said wheels being exchangeable for a different set, each set being characterized in that the relation of transmission ratio when one wheel is on the driving shaft as compared to when said one wheel is on the driven shaft equals the square of transmission ratio.

11. In a variable speed transmission, as claimed in claim 1, a chain suspended between said wheels and having a sag permitting turning of one wheel against the other during shifting thereof between the auxiliary and main shafts, one of said wheels having a smaller diameter and a shorter hub than the other to reduce said sag to a minimum.

12. In a variable speed transmission, as claimed in claim 1, together with, a casing including a stationary base and cover and being so dimensioned and arranged that the shifting and swinging movements of said support with the auxiliary shafts carry said wheels between said base and the top of said cover.

13. In a variable speed transmission, as claimed in claim 1, said means for shifting said wheels including a plate turnable about the axis of said support together therewith, said transmission element including a sprocket chain suspended between said wheels and including two strands, said mechanism including means operable for resiliently tensioning said chain comprising two pins supported above said plate, a lever secured to each pin, a freely turnable sprocket idler wheel journalled on the free end of each lever and meshing with a strand of said chain, said levers being sufficiently long to control the sideward movements of the strands of said chain, and resilient means operable for pressing said idler wheels against said strands for tensioning said chain.

14. In a variable speed transmission, as claimed in claim 13, each pin being rotatably journalled on said plate, said resilient means comprising a spring for each pin, each spring being connected with one end to a pin and having its other end immovable relative to the pin rotation.

15. In a variable speed transmission, as claimed in claim 14, together with, means for pretensioning said spring including a bracket secured to said rotatable pin and turnable with said rotatable pin about the axis thereof, and a step-by-step restraining mechanism intermediate said plate and said bracket including a ratchet wheel, and a releasable settable ratchet engageable when set with said ratchet wheel and operable for restraining turning of said pin in one direction.

References Cited in the file of this patent

UNITED STATES PATENTS

| Number | Name | Date |
|---|---|---|
| 433,446 | Cleveland | Aug. 5, 1890 |
| 804,980 | Reiss | Nov. 21, 1905 |
| 1,701,820 | Morse | Feb. 12, 1929 |